Figures 1, 2, 3, 4:
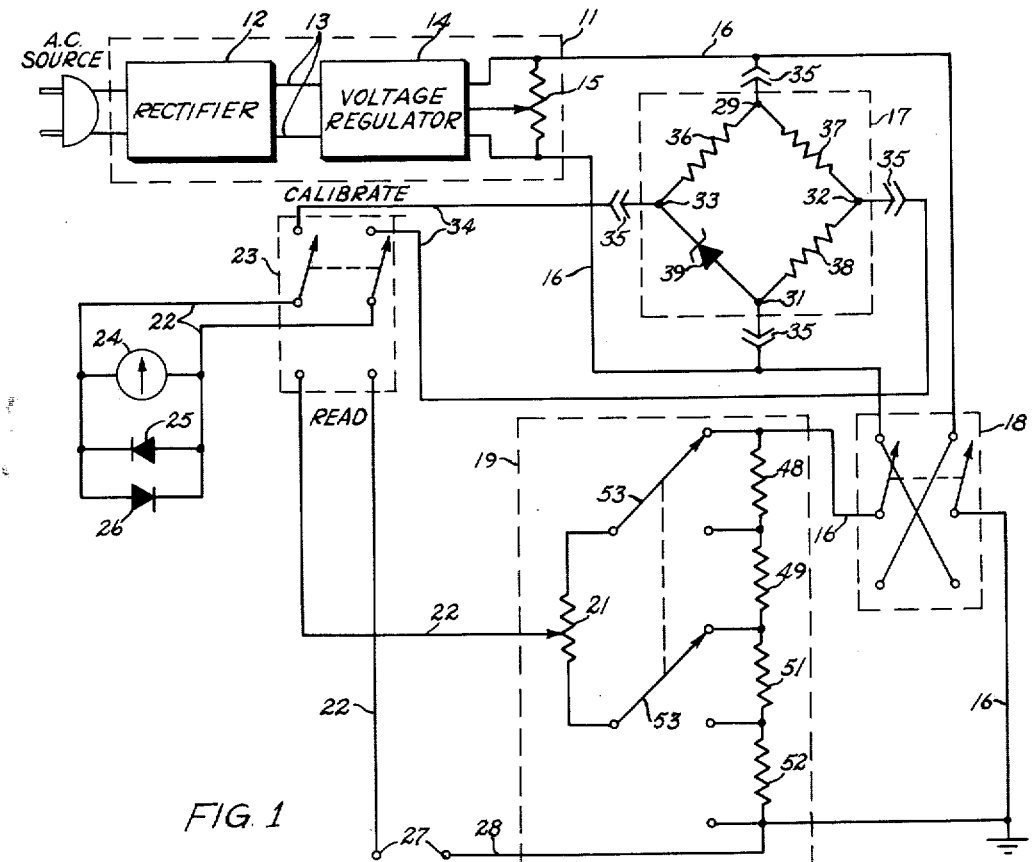

Sept. 3, 1963      E. H. PULLIAM      3,102,981

BRIDGE COMPARING VOLTAGE INDICATING DEVICE

Filed Aug. 30, 1960

INVENTOR.
EUGENE H. PULLIAM

BY

*H. H. Losch*
ATTORNEYS

United States Patent Office 3,102,981
Patented Sept. 3, 1963

1

3,102,981
BRIDGE COMPARING VOLTAGE INDICATING DEVICE
Eugene H. Pulliam, 4025 N. Audubon Road, Indianapolis 26, Ind.
Filed Aug. 30, 1960, Ser. No. 53,019
1 Claim. (Cl. 324—98)

(Granted under Title 35, U.S. Code (1952), sec. 266)

The invention described herein may be manufactured and used by or for the Government of the United States of America for governmental purposes without the payment of any royalties thereon or therefor.

This invention relates to voltage measuring devices embodying the null or potentiometer principle and more particularly to precise measurement of direct current voltage wherein the approximate value of the voltage to be measured is known and the subject invention is utilized to determine its exact value.

Those concerned with the development of military electronics equipment have long been aware of the need for a direct current voltmeter capable of voltage measurement with a high degree of precision and yet possessing the necessary ruggedness and stability required of a field service instrument. Such an instrument must be more economical to construct than comparable precision meters presently available and must also be capable of being serviced in field installations by local service personnel without loss of accuracy. Null type or potentiometer voltmeters presently available fail to meet these requirements for several reasons. Meters having the high degree of precision necessary lack the ruggedness and stability required of military field service instruments. Further, the present meters possessing the desired degree of accuracy require servicing by skilled personnel using laboratory type service apparatus and therefore are extremely difficult to maintain as useful units in military field applications.

The present invention overcomes these disadvantages of the prior art by utilizing novel circuitry to provide a direct current voltage measuring device incorporating a null or potentiometer principle thus obtaining an instrument having a high degree of accuracy, and yet due to the novel circuitry, one which can be maintained by military field personnel with ordinary service equipment. Generally, the invention consists of a regulated direct current voltage supply, a novel voltage sensitive bridge circuit including a temperature compensating resistance arrangement in the arms of the bridge, a null indicating meter and associated protective circuitry, and a voltage divider network. The regulated D.C. voltage supply has its output applied across the voltage sensitive bridge circuit and the null indicating meter in such a manner that the meter nulls when the exact voltage for which the bridge circuit is constructed is supplied by the regulated source. If the meter does not null, the source voltage is adjusted until a null is obtained. This known source voltage is then applied across the voltage divider network to the null meter; the voltage to be measured is also applied across the null meter with the polarities of the two voltages such that they oppose each other. If the meter nulls, then the voltage being measured is exactly equal to the known voltage from the regulated supply or some definite fraction thereof depending upon the position of the range switch in the divider network. If the meter does not null, one of the following steps would be performed, (1) if it is desired to make the voltage being measured equal to the known source voltage, the source of the voltage under test would be adjusted until the meter nulled thereby making the two voltages equal, or (2) if the unknown voltage is to be measured and not adjusted, a voltage calibrated potentiometer in the divider network would be adjusted until

2 the meter nulled, and the value of the unknown voltage would be determined by taking cognizance of the reading of the voltage-calibrated potentiometer in conjunction with the range switch position.

An object of the present invention is to provide an accurate D.C. voltage measuring device utilizing a null or potentiometer principle.

Another object is to provide an accurate D.C. voltage measuring device sufficiently rugged and stable to enable it to be used and maintained by the military as a field service instrument in the repair and construction of radar and similar equipment.

A further object of the invention is the provision of a precision D.C. voltage measuring device including a temperature compensated voltage sensitive bridge circuit employing a novel heat stabilization and temperature compensating resistance arrangement.

Other objects and advantages of the invention will hereinafter become more fully apparent from the following description of the annexed drawings, which illustrate a preferred embodiment and wherein:

FIGURE 1 is a schematic diagram of a preferred form of the invention,

FIGURE 2 is an alternative arrangement of the voltage sensitive bridge circuit shown in FIGURE 1 adapted to be used as a portable self-contained indicating instrument for precision adjustment of one or more previously selected values of voltage from regulated D.C. voltage sources, FIGURE 3 is a schematic diagram of a temperature compensating resistance unit to be substituted for fixed precision resistance 38 in FIGURE 1 to correct for any voltage-impedance variation occurring in voltage regulating diode 39 due to changes in its operating or ambient temperatures. This resistance unit may also be adapted to many other applications of electrical circuitry in which it is necessary to compensate for changes in resistance of components due to temperature variations, and FIGURE 4 illustrates a novel metallic bobbin heat stabilization device which serves as a mounting for the temperature compensating resistance unit shown in FIGURE 3 and constant voltage diode 39 shown in the bridge circuit of FIGURE 1 to maintain these elements at the same operating temperature.

Referring now to the drawings, wherein like reference characters designate like or corresponding parts throughout the several views, there is shown in FIGURE 1 an adjustable regulated direct current voltage supply 11 comprising a rectifier 12 coupled by conductors 13 to a D.C. voltage regulator 14 whose output is applied via potentiometer 15 to conductors 16. Conductors 16 couple voltage supply 11 to voltage sensitive bridge circuit 17 via terminals 29 and 31 and, through polarity reversing switch 18, to voltage dividing network 19; the output of network 19 is applied through voltage calibrated potentiometer 21 via conductor 22 to "read-calibrate" switch 23. Assuming switch 23 to be in the "read" position, network 19 is thereby coupled through null indicating meter 24 and protective diodes 25 and 26 to one of the input terminals 27 for the D.C. voltage to be determined, the other input terminal 27 being coupled via conductor 28 to the grounded terminal of voltage divider network 19. Voltage sensitive bridge circuit 17 is coupled from terminals 32 and 33 to the "calibrate" position of "read-calibrate" switch 23 via conductors 34. When switch 23 is placed in the "calibrate" position, null meter 24 is placed across bridge circuit 17 between terminals 32 and 33. Double arrow elements 35 inserted in the leads from bridge circuit 17 indicate that in this particular embodiment the entire bridge circuit may be constructed as a self-contained pluggable unit. Elements 36, 37, and 38 shown in bridge circuit 17 are fixed precision resistors, and element 39 is a diode exhibiting the zener or avalanche effect such that in the region of its operation in circuit 17, the potential across it remains constant for a wide range of current flow therethrough. Elements 48, 49, 51, and 52 are all precision resistors having identical values of resistance which in conjunction with range selecting switch 53 and voltage calibrated potentiometer 21 form a range selecting voltage divider network 19 to enable the circuit of FIGURE 1 to measure a wide range of voltages.

In FIGURE 2 there is shown a variation of the pluggable voltage sensitive bridge circuit 17 of FIGURE 1, adapted to be used as an indicating instrument for determining and adjusting the output of regulated D.C. voltage supplies. Many of the elements of the circuit in FIGURE 2 are identical to those of circuit 17 in FIGURE 1 and have been given the same designating numbers. Element 55 is a voltage regulating tube serving to maintain a constant potential between terminals 33 and 31, thus performing the same function as diode 39 in FIGURE 1. Diode 56 is placed in series with voltage regulator 55 to compensate for changes in voltage regulator 55 due to temperature changes and is a relatively low voltage diode, performing a different function from diode 39 of FIGURE 1. Elements 58 and 59 are fixed precision resistors and element 57 is a switch which in the open position places resistors 58 and 59 in parallel with null meter 24 and thus effectively removes them from the circuit, permitting the measurement of a relatively high voltage which would be applied to input terminals 61. However, with switch 57 in the closed position, resistance 59 is placed in parallel with resistance 36 and resistance 58 is placed in parallel with resistance 37 thereby decreasing the total resistance of each of the upper arms of the bridge circuit. Therefore, if switch 57 is open, meter 24 will null when a predetermined relatively high value of voltage is placed across terminals 61, and with switch 57 closed meter 24 will null at a relatively lower value of voltage. The purpose of resistors 58 and 59, and switch 57 is to enable the voltage sensitive bridge circuit of FIGURE 2 to null at two different values of voltage depending on the position of the switch. The bridge circuit of FIGURE 2 is substantially equivalent to, and interchangeable with, circuit 17 of FIGURE 1. However, diode 39 is preferred over the combination of voltage regulator 55 and temperature compensating diode 56 because of its greater stability and smaller size.

In FIGURE 3 there is shown a novel temperature compensating unit which may be substituted, where extreme accuracy is necessary, for fixed precision resistance 38 in the voltage sensitive bridge circuit 17 of FIGURE 1 to compensate for voltage impedance changes in regulating diode 39 due to temperature changes. Elements 41 and 42 are precision resistances wound from wire having a high temperature coefficient of resistance, while elements 43 and 44 are precision resistances wound from wire having a substantially zero coefficient of resistance. When these resistances are selected in the proper proportion and coupled in the series parallel type of arrangement shown in FIGURE 3, a unit is formed whose resistance varies with temperature in the same proportion as that of regulating diode 39 for which it is intended to compensate.

In FIGURE 4 there is shown a novel heat stabilization unit consisting of a cylindrical heat conducting metallic bobbin 62 having annular channeled portions 64, 65, and 66 in which are wound the necessary lengths of insulated resistance wire to form the temperature resistance compensating unit of FIGURE 3. Channel 64 receives a sufficient quantity of wire having a high temperature coefficient of resistance to form resistance 41 shown in FIGURE 3; channel 65 receives a first winding of high temperature coefficient wire to form resistance 42, then a second winding of substantially zero temperature coefficient of resistance wire is applied over this first winding 42 to form resistance 43, the high temperature coefficient wire being applied next to the metallic heat conducting bobbin because its resistance is more sensitive to temperature change than resistance 43 and thus its temperature should be maintained constant with that of the stabilizing bobbin. Wire having a substantially zero coefficient of resistance is wound in channel 66 in sufficient quantity to form resistance 44. The ends of wires 41, 42, 43, and 44 are connected to terminal wires 31, 67, 68, and 32 which are held in place by a suitable insulating resin glue in cavities 63 in the wall of cylindrical bobbin 62. A hole running longitudinally through the center of the bobbin is tapped at the bottom for a suitable mounting screw and at the top for the threaded portion of diode 39. By mounting diode 39, and its temperature resistance compensating unit of FIGURE 3 on temperature stabilization unit 62, these elements are maintained at the same relative operating temperature thus eliminating warm up drift and improving the accuracy of bridge circuit 17 over that obtained through individual mountings.

The values of elements 36, 37, 38, and 39, of voltage sensitive bridge circuit 17 in FIGURE 1 will obviously be determined by the selection of the value of regulated D.C. voltage to be obtained from voltage supply 11. When this, and only this, particular voltage is obtained from supply 11 and applied across terminals 29 and 31, switch 23 of FIGURE 1 being in the "calibrate" position, bridge circuit 17 should cause meter 24 to null. If meter 24 does not null, which would indicate that the D.C. voltage from supply 11 is slightly above or below the desired level, potentiometer 15 is adjusted to vary the output of supply 11 until a null is obtained. If meter 24 is to null when connected between terminals 32 and 33 of bridge 17, there must be no difference in potential between these two terminals. Thus at the balance point only, the difference in potential between terminals 33 and 31 must be exactly equal to that between terminals 32 and 31. In which case no potential difference will exist between terminals 33 and 32, no current will flow between these two points, and meter 24 will null. If the D.C. voltage from source 11 is above or below the desired value for which voltage sensitive bridge 17 has been constructed, the following conditions will exist. The voltage between terminals 33 and 31 will remain constant at the nominal zener voltage of voltage regulating Zener diode 39, which is the same voltage present across these terminals during the balanced condition because the diode is selected to have a constant voltage across it for a wide range of current flow therethrough. However, the voltage between terminals 32 and 31 will increase if the source voltage is above the desired value, and will decrease if it is below. This results from an increase or decrease in current flow through resistances 37 and 38, while the change in current flow through diode 39 has no effect on the voltage across it. Thus it can be seen that the voltage across diode 39 is equal to that across resistance 38 only at the balanced point. A wide variety of values may be used in elements 36, 37, 38, and 39 so long as the following relationship is maintained by the circuit 17 at the balanced point, $$\frac{V_R}{V_S}=\frac{R_{38}}{R_{37}+R_{38}} \qquad \text{(Relation 1)}$$

where $V_R$ is the voltage across voltage regulating diode 39 measured at terminals 33 and 31, $V_S$ is the value of the D.C. regulated voltage supplied by source 11 to which bridge 17 is arranged to be sensitive, $R_{37}$ is the ohmic value of resistance 37, and $R_{38}$ is the ohmic value of resistance 38. The same type of relationship must be maintained in selecting components for the circuit of FIGURE 2, with the following modifications. With switch 57 in the open position, resistances 58 and 59 are effectively removed from the circuit and the bridge of FIGURE 2 is in condition to null at the exact value of the higher of two voltages which it is constructed to measure; let this voltage be designated as $V_{S\ high}$. When switch 57 is closed, the bridge is in condition to measure the lower of the desired D.C. regulated voltages, $V_{S\ low}$, either of these voltages being applied across test terminals 61. Various values may be used for the components of FIGURE 2 so long as the following relationships are maintained.

With switch 57 in the open position, $$\frac{V_R}{V_{S\ high}} = \frac{R_{38}}{R_{37}+R_{38}} \quad \text{(Relation 2)}$$

where $V_R$ is the voltage across voltage regulating tube 55 and temperature compensating diode 56 measured at terminals 33 and 31, $V_{S\ high}$ is the higher of two voltages for which the bridge is constructed to null, and $R_{37}$ and $R_{38}$ are defined as in relation 1. With switch 57 in the closed position, the following relation must be maintained, $$\frac{V_R}{V_{S\ low}} = \frac{R_{38}}{R_{38}+\left(\frac{R_{37}R_{58}}{R_{37}+R_{38}}\right)} \quad \text{(Relation 3)}$$

where $V_R$, $R_{37}$, and $R_{38}$ are defined as in Relation 2, $V_{S\ low}$ is the lower of the two voltages to be measured by the circuit of FIGURE 2, and $R_{58}$ is the ohmic value of resistance 58 in FIGURE 2.

After selecting a particular Zener diode for element 39 of bridge 17 in FIGURE 1 and values of resistance for elements 36, 37, and 38 such that Relation 1 will exist at the balanced point, the determination of values for elements 41, 42, 43, and 44 of the temperature resistance compensating network of FIGURE 3 which replaces fixed resistance 38 if increased accuracy is desired would be made as follows:

First, a resistance wire having a suitably high temperature coefficient of resistance would be selected for winding resistances 41 and 42; a satisfactory wire for this purpose has been found to be an alloy of 70% nickel and 30% iron. Next, a wire having a substantially zero temperature coefficient of resistance would be selected for winding resistances 43 and 44; such a wire has been found which has the following composition, 74.5% nickel, 20% chromium, 2.75% aluminum, and 2.75% copper. These wires are commercially available and have proven suitable for use in the network of FIGURE 3. However, wires having desirable coefficients and compositions different from those described are available, and the selection of a suitable pair is to a certain extent, a matter of choice. Having selected insulated resistance wire having the desired coefficients which shall be designated as $C_h$ for the high temperature coefficient of resistance wire and $C_0$ for the wire having a substantially zero temperature resistance coefficient, the value of resistance for element 41 is determined by the following relationship $$R_{41} = \frac{C_D \times \Delta R_D}{(C_h)^2} \quad \text{(Relation 4)}$$

where $C_D$ is the voltage temperature coefficient of the element for which compensation is desired which in this case is diode 39 for bridge 17, and $\Delta R_D$ is the change in resistance required of element 38 per degree of temperature change in order to compensate for the change in voltage of diode 39; these two values would be obtained from literature supplied by the manufacturer of the selected diode 39 or by laboratory experimentation. The symbol $C_h$ represents the temperature coefficient of resistance of the high coefficient wire of which resistance 41 is to be wound. A quantity of this high coefficient wire $C_h$ sufficient to supply the ohmic value $R_{41}$ of relation 4 would then be wound onto temperature stabilizing bobbin 62 of FIGURE 4 and connected to terminal posts 31 and 67. Resistance 42 would then be determined as follows, $$R_{42} = 4\left[\frac{\Delta R_D - \frac{C_D \times \Delta R_D}{C_h}}{C_h}\right] \quad \text{(Relation 5)}$$

where $R_{42}$ is the ohmic value of element 42 in FIGURE 3 and the remaining symbols are defined as in Relation 4. Resistance 42 would then be wound on bobbin 62 of FIGURE 4 of the same resistance wire as element 41, and connected to terminals 67 and 68. Resistance 43 is made equal in ohmic value to resistance 42 at a reference temperature, and is wound of substantially zero temperature resistance coefficient wire on top of resistance 42 on bobbin 62 and also connected to terminals 67 and 68, thereby placing resistances 42 and 43 in parallel with each other and in series with resistance 41. Resistance 44 is wound from the same wire as resistance 43 and its ohmic value is determined as follows $$R_{44} = R_{38} - \left(R_{41} + \frac{R_{42}R_{43}}{R_{42}+R_{43}}\right) \quad \text{(Relation 6)}$$

where $R_{38}$ is the resistance of fixed resistance 38 of FIGURE 1, which the network of FIGURE 3 is to replace in order to insure higher accuracy.

Element 19 shown in FIGURE 1 is a voltage divider range selector network of the Kelvin-Varley principle in which the following relationship must be maintained $$R_{48} = R_{49} = R_{51} = R_{52} = \tfrac{1}{2}R_{21} \quad \text{(Relation 7)}$$

In operation, the D.C. voltmeter of FIGURE 1 would have regulated D.C. voltage supply 11 coupled to a source of A.C. voltage. Assuming for explanation purposes only that a particular unit constructed in accordance with FIGURE 1 is to measure D.C. voltages from 0 to 300 volts, the supply 11 would be constructed to provide 300 volts via conductors 16 to terminals 29 and 31 of voltage sensitive bridge circuit 17, and through switch 18 to divider network 19. The first step in measuring a D.C. voltage of 300 volts or less is to calibrate the power supply 11 to make certain that it is supplying exactly 300 volts to divider network 19. This is done by placing switch 23 in the "calibrate" position thereby placing null meter 24 across terminals 32 and 33 of voltage sensitive bridge circuit 17 which has been constructed to null at exactly 300 volts from supply 11. If meter 24 nulls, then supply 11 is providing 300 volts to divider 19. If the meter does not null, calibration potentiometer 15 in supply 11 is adjusted to vary its output until the meter does null thus indicating exactly 300 volts across divider 19. Switch 23 is now placed in the "read" position, the unknown voltage is applied to terminals 27, and polarity switch 18 is placed in a position such that the voltage from supply 11 opposes the unknown voltage. With range selector switch 53 in the uppermost or 200–300 volt range as shown in FIGURE 1, voltage calibrated potentiometer 21 would be adjusted until member 24 nulled; the reading of potentiometer 21 which would be calibrated from 0 to 100 volts would be added to 200 volts because of the position of range selector switch and this would be the value of the unknown voltage. If meter 24 would not null throughout the entire range of potentiometer 21, then range switch 53 would be moved down to the 100–200 volt range, i.e. across resistances 49 and 51, and potentiometer 21 again adjusted for a null; in this position the value of the unknown voltage would be equal to 100 volts plus the reading of potentiometer 21. With switch 53 across resistances 51 and 52, the value of unknown voltage across terminals 27 would be equal to the reading of potentiometer 21.

If it is desired to adjust an unknown D.C. voltage source to an exact value rather than to measure its present value, potentiometer 21 and range selector switch 53 would be positioned such that their total value would equal the value to which the unknown source is to be adjusted.

This source would then be placed across terminals 27, in opposition to the voltage from supply 11, and adjusted until meter 24 nulls, thus indicating that the unknown source is now supplying the desired voltage.

Thus it becomes apparent from the foregoing description and annexed drawings that the subject invention, a versatile, highly accurate direct current voltmeter, is a useful and practical instrument having many applications in both industrial and military facilities. The high degree of accuracy obtainable with this device results from its utilization of the null principle of electrical measurement and the incorporation of a novel arrangement which compensates for changes in resistance in certain elements of the voltage sensitive bridge circuit due to temperature variations. Its ease of serviceability without expensive laboratory equipment or highly skilled personnel, due to the construction of its voltage sensitive bridge circuit as a pluggable unit which may be replaced by simply removing the defective circuit and inserting a new one calibrated to balance at the selected voltage, makes this device a desirable unit for use in military field applications where the time available for servicing equipment is at a premium.

Obviously many modifications and variations of the present invention are possible in the light of the above teachings. It is therefore to be understood that within the scope of the appended claim, the invention may be practiced otherwise than as specifically described.

What is claimed is:

A voltage comparison measuring circuit comprising:
 a null indicating meter having protective diode circuitry coupled thereacross;
 a voltage sensitive four terminal bridge circuit having three arms each containing a resistance element, and a fourth arm containing a Zener diode semiconductor element;
 a source of adjustable regulated direct current reference voltage having one terminal thereof coupled to the terminal of said bridge circuit common to the anode of said Zener diode semiconductor element, and the other terminal thereof coupled to the terminal of said bridge circuit opposite to said terminal common to the anode of said Zener diode semiconductor element;
 a first double pole, double throw switch means having its center terminals coupled across said null indicating meter, and having one pair of its two pairs of end terminals coupled across the remaining two terminals of said four terminal bridge circuit, so that when placed in a first position said first switch means connects said null indicating meter across said bridge circuit for indicating whether said source of adjustable reference voltage is producing the desired value of potential and, if not, to enable accurate adjustment thereof;
 a double pole, double throw polarity reversing switch means having its two pairs of end terminals alternately coupled across said source of reference voltage;
 a calibrated voltage dividing potentiometer means having a plurality of switchable ranges and an adjustable control to provide fine adjustment within each of said ranges, said potentiometer means having input terminals coupled to the pair of center terminals of said polarity reversing switch means and having output terminals for receiving the voltage to be measured, one of said output terminals being coupled directly to a terminal of said voltage to be measured and the other output terminal thereof being coupled via the other pair of end terminals of said first switch means, through said null indicating meter when said first switch means is in a second position, to the other terminal of said voltage to be measured.

References Cited in the file of this patent

UNITED STATES PATENTS

| | | |
|---|---|---|
| 1,667,624 | Corson | Apr. 24, 1928 |
| 2,166,935 | Adams | July 25, 1939 |
| 2,277,365 | Michael | Mar. 24, 1942 |
| 2,443,073 | Knudsen | June 8, 1948 |
| 2,830,252 | Amey | Apr. 8, 1958 |
| 2,864,999 | Sullivan | Dec. 16, 1958 |
| 2,919,407 | Sundt | Dec. 29, 1959 |

UNITED STATES PATENT OFFICE

CERTIFICATE OF CORRECTION

Patent No. 3,102,981 September 3, 1963

Eugene H. Pulliam

It is hereby certified that error appears in the above numbered patent requiring correction and that the said Letters Patent should read as corrected below.

Column 5, lines 22 to 25, for that portion of the formula reading $$\left(\frac{R_{37}R_{58}}{R_{37}+R_{38}}\right) \quad \text{read} \quad \left(\frac{R_{37}R_{58}}{R_{37}+R_{58}}\right)$$

column 6, line 57, for "member" read -- meter --.

Signed and sealed this 3rd day of March 1964.

(SEAL)
Attest:
ERNEST W. SWIDER
Attesting Officer

EDWIN L. REYNOLDS
Acting Commissioner of Patents